US011120981B2

United States Patent
Kotani et al.

(10) Patent No.: US 11,120,981 B2
(45) Date of Patent: Sep. 14, 2021

(54) LASER DESORPTION/IONIZATION METHOD AND MASS SPECTROMETRY METHOD

(71) Applicant: HAMAMATSU PHOTONICS K.K., Hamamatsu (JP)

(72) Inventors: Masahiro Kotani, Hamamatsu (JP); Takayuki Ohmura, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 0 days.

(21) Appl. No.: 16/647,498

(22) PCT Filed: Jul. 31, 2018

(86) PCT No.: PCT/JP2018/028682
§ 371 (c)(1),
(2) Date: Mar. 14, 2020

(87) PCT Pub. No.: WO2019/058768
PCT Pub. Date: Mar. 28, 2019

(65) Prior Publication Data
US 2020/0219713 A1    Jul. 9, 2020

(30) Foreign Application Priority Data

Sep. 21, 2017 (JP) .............................. JP2017-181605

(51) Int. Cl.
*H01J 49/16* (2006.01)
*G01N 27/62* (2021.01)
(Continued)

(52) U.S. Cl.
CPC ............ *H01J 49/164* (2013.01); *G01N 27/62* (2013.01); *H01J 49/0468* (2013.01); *G01N 1/02* (2013.01)

(58) Field of Classification Search
None
See application file for complete search history.

(56) References Cited

U.S. PATENT DOCUMENTS 6,288,390 B1 * 9/2001 Siuzdak .............. H01J 49/0418
250/288
6,825,045 B2 * 11/2004 Haglund, Jr. ..... G01N 27/44717
250/281
(Continued)

FOREIGN PATENT DOCUMENTS

EP        3214437 A1     9/2017
JP     2007-309860 A    11/2007
(Continued)

OTHER PUBLICATIONS

International Preliminary Report on Patentability dated Apr. 2, 2020 for PCT/JP2018/028682.
(Continued)

*Primary Examiner* — Andrew Smyth
(74) *Attorney, Agent, or Firm* — Faegre Drinker Biddle & Reath LLP (57) ABSTRACT

A laser desorption/ionization method includes: a first process of preparing a sample support body that includes a substrate in which a plurality of through-holes are formed and a conductive layer that is provided on the first surface of the substrate; a second process of mounting a frozen sample on a mounting surface of a mount under a sub-freezing atmosphere, and fixing the sample support body to the mount in a state in which the second surface is in contact with the frozen sample; a third process of thawing the sample, and moving components of the thawed sample toward the first surface via the plurality of through-holes due to a capillary phenomenon; and a fourth process of irradiating the first surface with a laser beam while applying a
(Continued)

voltage to the conductive layer, and ionizing the components that have moved toward the first surface.

8 Claims, 7 Drawing Sheets

(51) Int. Cl.
    *H01J 49/04* (2006.01)
    *G01N 1/02* (2006.01)

(56) References Cited

U.S. PATENT DOCUMENTS

| | | |
|---|---|---|
| 2009/0197295 A1 | 8/2009 | Fournier et al. |
| 2012/0295276 A1 | 11/2012 | Cooks et al. |

FOREIGN PATENT DOCUMENTS

| | | | | |
|---|---|---|---|---|
| JP | 2007309860 A | * | 11/2007 | |
| JP | 2009-080106 A | | 4/2009 | |
| JP | 2009080106 A | * | 4/2009 | ........... B01L 3/0244 |
| JP | 5129628 B2 | * | 1/2013 | |
| JP | 5854781 B2 | | 2/2016 | |
| WO | WO-2007/055293 A1 | | 5/2007 | |
| WO | WO-2007055293 A1 | * | 5/2007 | ......... H01J 49/0009 |
| WO | WO-2017/038709 A1 | | 3/2017 | |

OTHER PUBLICATIONS

David M. G. Anderson et al., "A method to prevent protein delocalization in imaging mass spectrometry of non-adherent tissues: application to small vertebrate lens imaging", Analytical and Bioanalytical Chemistry, Springer Berlin Heidelberg, DE, vol. 407, No. 8, Feb. 10, 2015, p. 2311-p. 2320, XP035467708.

* cited by examiner

LASER DESORPTION/IONIZATION METHOD AND MASS SPECTROMETRY METHOD

TECHNICAL FIELD

The present disclosure relates to a laser desorption/ionization method and a mass spectrometry method.

BACKGROUND ART

As a technique for ionizing a sample such as a biological sample in order to perform mass spectrometry or the like, matrix-assisted laser desorption/ionization (MALDI) is known. MALDI is a technique for ionizing a sample by adding a low-molecular weight organic compound, which is called a matrix and absorbs a laser beam, to the sample and irradiating it with the laser beam. According to this technique, a heat-labile substance or a high-molecular-weight substance can be subjected to non-destructive ionization (so-called soft ionization).

On the other hand, as a technique for performing ionization without using such a matrix, surface-assisted laser desorption/ionization (SALDI) is known (e.g., see Patent Literatures 1 and 2). SALDI is a technique for ionizing a sample by dropping the sample onto an ionization substrate whose surface has an uneven microstructure and irradiating it with a laser beam.

CITATION LIST

Patent Literature

Patent Literature 1: Japanese Patent No. 5129628
Patent Literature 2: U.S. Pat. No. 6,288,390

SUMMARY OF INVENTION

Technical Problem

However, in the above laser desorption/ionization method, it is difficult to ionize the sample while maintaining original positional information of the sample (information of two-dimensional distribution of molecules composing the sample). Furthermore, it is difficult to image the two-dimensional distribution of the molecules composing the sample.

Therefore, the present disclosure is directed to providing a laser desorption/ionization method and a mass spectrometry method capable of ionizing components of a sample while maintaining positional information of the sample.

Solution to Problem

A laser desorption/ionization method of an aspect of the present disclosure includes: a first process of preparing a sample support body that includes a substrate in which a plurality of through-holes open in first and second surfaces facing each other are formed and a conductive layer that is at least provided on the first surface; a second process of mounting a frozen sample on a mounting surface of a mount under a sub-freezing atmosphere, and fixing the sample support body to the mount in a state in which the second surface is in contact with the frozen sample; a third process of thawing the sample in a state in which the sample is disposed between the mount and the sample support body, and moving components of the thawed sample toward the first surface via the plurality of through-holes due to a capillary phenomenon; and a fourth process of irradiating the first surface with a laser beam while applying a voltage to the conductive layer in the state in which the sample is disposed between the mount and the sample support body, and ionizing the components that have moved toward the first surface.

In the laser desorption/ionization method, the components of the thawed sample in the substrate of the sample support body move toward the first surface via the plurality of through-holes by a capillary phenomenon. Thus, positional information of the sample (information of two-dimensional distribution of molecules composing the sample) is maintained in the components of the sample that have moved toward the first surface of the substrate. In this state, since the first surface of the substrate is irradiated with the laser beam while a voltage is applied to the conductive layer, the components of the sample are ionized while the positional information of the sample is maintained. Moreover, as the preparing step, the frozen sample is mounted on the mounting surface of the mount under a sub-freezing atmosphere, and the sample support body is fixed to the mount in a state in which the second surface of the substrate is in contact with the frozen sample. Thus, when the sample is thawed, shrinkage of the sample is curbed. This also greatly contributes to the maintenance of the positional information of the sample. Furthermore, as the sample becomes thick, the sample tends to greatly shrink when thawed. However, the sample can be made thick in proportion when the shrinkage of the sample is curbed. This contributes to securing signal intensity when the ionized components are detected. As described above, according to the laser desorption/ionization method using the sample support body the components of the sample can be ionized while the positional information of the sample is maintained.

In the laser desorption/ionization method of the aspect of the present disclosure, the sample may be a hydrous sample. In the case where the sample is a hydrous sample, the sample is disposed between the mount and the sample support body in a state in which the sample is frozen. Afterwards, thawing the sample is particularly effective in curbing shrinkage of the sample and maintaining the positional information of the sample.

In the laser desorption/ionization method of the aspect of the present disclosure, the sample may be a biological sample. In the case where the sample is a biological sample, the sample is disposed between the mount and the sample support body in a state in which the sample is frozen. Afterwards, thawing the sample is particularly effective in curbing shrinkage of the sample to maintain the positional information of the sample.

In the laser desorption/ionization method of the aspect of the present disclosure, in the third process, the mount, the sample support body, and the sample may be left under a normal temperature atmosphere in the state in which the sample is disposed between the mount and the sample support body, and thus the sample may be thawed. Thus, since the sample can be thawed while more reliably curbing the shrinkage of the sample, the positional information of the sample may be more accurately maintained.

In the laser desorption/ionization method of the aspect of the present disclosure, in the third process, the sample may be thawed in the state in which the sample is disposed between the mount and the sample support body and the sample support body is disposed below the mount. Thus, since the gravitational force acts on the frozen sample, the frozen sample can be reliably brought into contact with the second surface of the substrate. Furthermore, since the gravitational force also acts in addition to the capillary phenomenon, the components of the thawed sample can be more efficiently moved toward the first surface of the substrate.

A laser desorption/ionization method of an aspect of the present disclosure includes: a first process of preparing a sample support body that includes a substrate which has conductivity and in which a plurality of through-holes that open in first and second surfaces facing each other are formed; a second process of mounting a frozen sample on a mounting surface of a mount under a sub-freezing atmosphere, and fixing the sample support body to the mount in a state in which the second surface is in contact with the frozen sample; a third process of thawing the sample in a state in which the sample is disposed between the mount and the sample support body, and moving components of the thawed sample toward the first surface via the plurality of through-holes due to a capillary phenomenon; and a fourth process of irradiating the first surface with a laser beam while applying a voltage to the substrate in the state in which the sample is disposed between the mount and the sample support body, and ionizing the components that have moved toward the first surface.

According to the laser desorption/ionization method, the conductive layer can be omitted in the sample support body; and the same effect as the case where the sample support body having the conductive layer as described above is used can be obtained.

A mass spectrometry method of an aspect of the present disclosure includes: the processes of the aforementioned laser desorption/ionization method; and a fifth process of detecting the components ionized in the fourth process.

According to the mass spectrometry method, since the components of the sample are ionized while the positional information of the sample is maintained, two-dimensional distribution of molecules composing the sample can be accurately imaged.

Advantageous Effects of Invention

According to the present disclosure, a laser desorption/ionization method and a mass spectrometry method cable of ionizing components of a sample while maintaining positional information of the sample can be provided.

DESCRIPTION OF EMBODIMENTS

Hereinafter, an embodiment of the present disclosure will be described in detail with reference to the drawings. Note that the same or equivalent portions are denoted by the same reference signs in each of the drawings, and duplicate descriptions thereof will be omitted.

Figure 1:
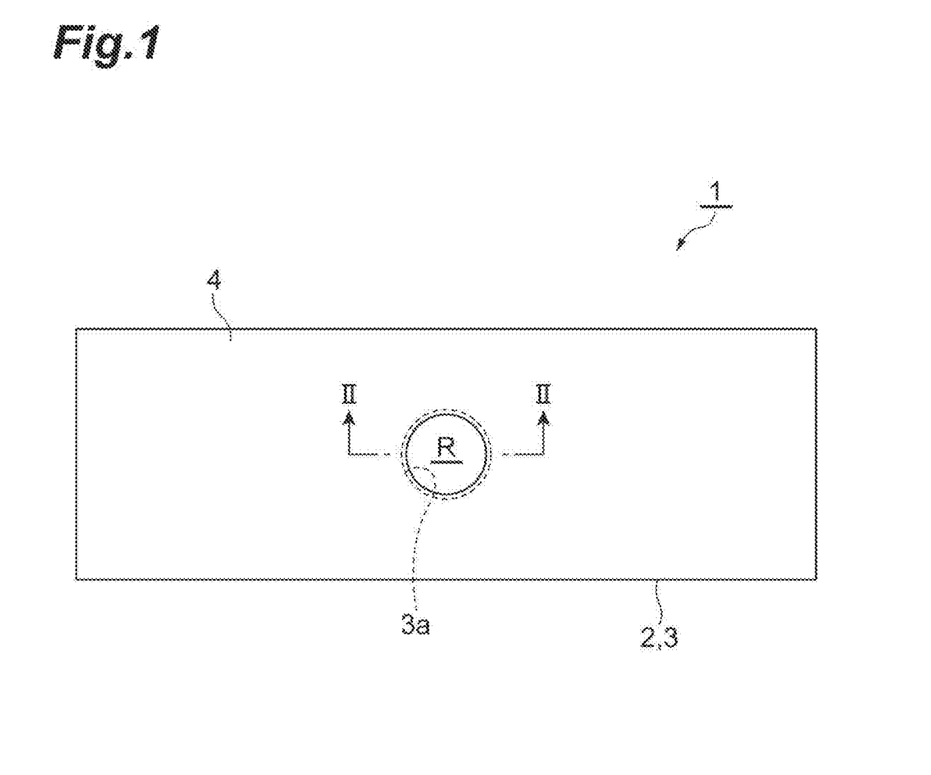
FIG. 1 is a top view of a sample support body used in a laser desorption/ionization method and a mass spectrometry method of an embodiment.
Figure 2:
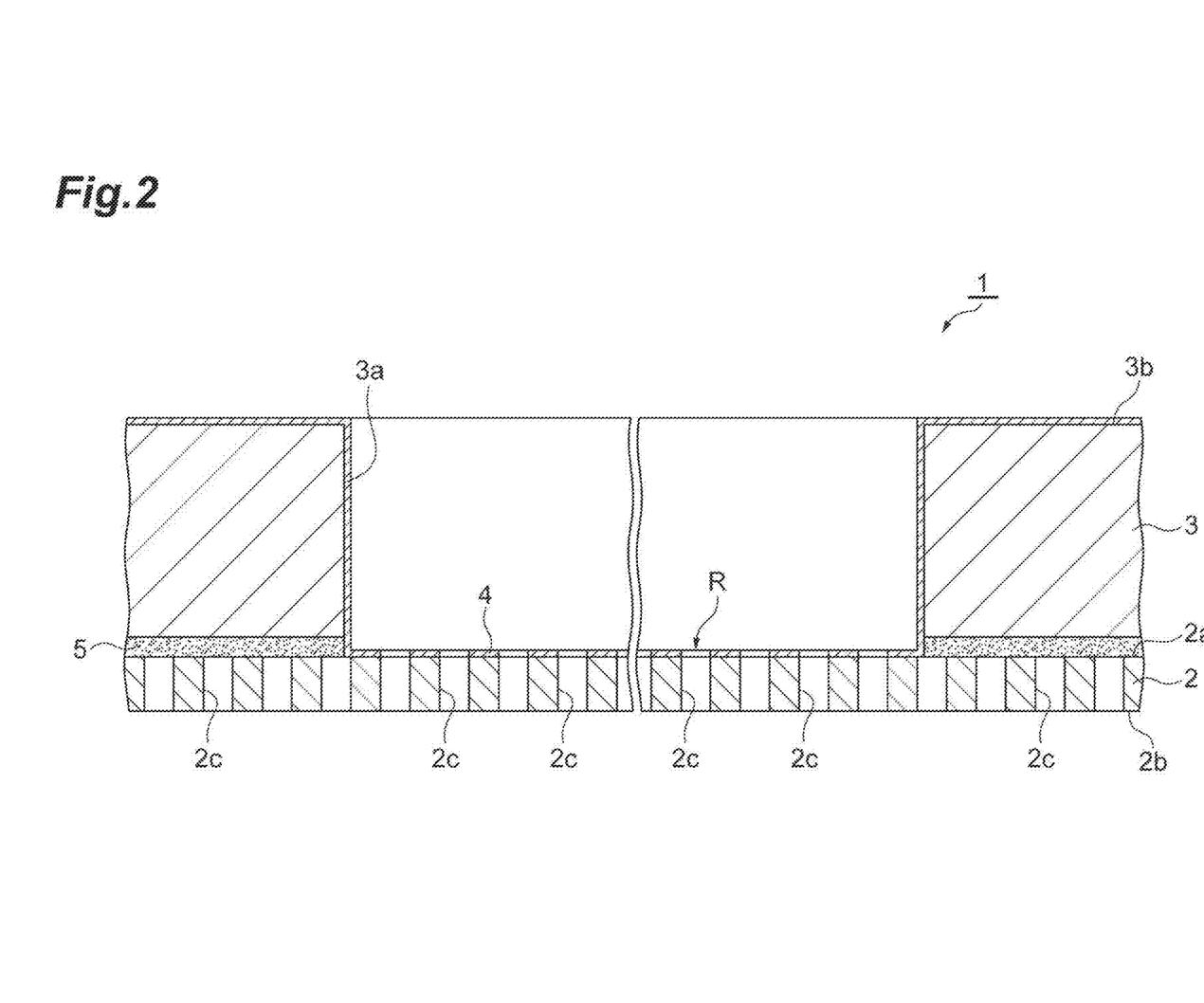
FIG. 2 is a sectional view of the sample support body along line II-II illustrated in FIG. 1.

First, a sample support body used in a laser desorption/ionization method and a mass spectrometry method of an embodiment will be described. As illustrated in FIGS. 1 and 2, a sample support body 1 includes a substrate 2, a frame 3, and a conductive layer 4. The substrate 2 has a first surface 2a and a second surface 2b that face each other. A plurality of through-holes 2c are formed in the substrate 2 in a uniform manner (with uniform distribution). Each of the through-holes 2c extends in a thickness direction of the substrate 2 (a direction perpendicular to the first surface 2a and the second surface 2b), and opens in the first surface 2a and the second surface 2b.

The substrate 2 is formed of, for instance, an insulating material in the shape of a rectangular plate. When viewed in the thickness direction of the substrate 2, a length of one side of the substrate 2 is, for instance, several centimeters or so, and a thickness of the substrate 2 is, for instance, about 1 μm to 50 μm. When viewed in the thickness direction of the substrate 2, shapes of the through-holes 2c are, for instance, nearly circular shapes. Widths of the through-holes 2c are, for instance, about 1 nm to 700 nm. The widths of the through-holes 2c are diameters of the through-holes 2c in a case where, when viewed in the thickness direction of the substrate 2, the shapes of the through-holes 2c are the nearly circular shapes, and are diameters (effective diameters) of virtual maximum columns fitted into the through-holes 2c in a case where the shapes are not the nearly circular shapes.

The frame 3 is provided on the first surface 2a of the substrate 2. To be specific, the frame 3 is fixed to the first surface 2a of the substrate 2 by a bonding layer 5. As a material of the bonding layer 5, a bonding material (e.g., a low melting point glass, a bond for vacuum, etc.) having little discharge gas is preferably used. When viewed in the thickness direction of the substrate 2, the frame 3 has nearly the same outline as the substrate 2. An opening 3a is formed in the frame 3. A portion of the substrate 2 which corresponds to the opening 3a functions as an effective region R for moving components of a sample toward the first surface 2a by means of a capillary phenomenon (to be described below).

The frame 3 is formed of, for instance, an insulating material in the shape of a rectangular plate. When viewed in the thickness direction of the substrate; 2, a length of one side of the frame 3 is, for instance, several centimeters or so, and a thickness of the frame 3 is, for instance, 1 min or less. When viewed in the thickness direction of the substrate 2, a shape of the opening 3a is, for instance, a circular shape. In that case, a diameter of the opening 3a is, for instance, about several millimeters to tens of millimeters. Due, to this frame 3, handling of the sample support body 1 is facilitated, and deformation of the substrate 2 caused by, for instance, a change in temperature is curbed.

The conductive layer 4 is provided on the first surface 2a of the substrate 2. To be specific, the conductive layer 4 is continuously (integrally) formed in a region of the first surface 2a of the substrate 2 which corresponds to the opening 3a of the frame 3 (i.e., a region corresponding to the effective region R), an inner surface of the opening 3a, and a surface 3b of the frame 3 which is located on the opposite side of the substrate 2. The conductive layer 4 covers a portion of the first surface 2a of the substrate 2 at which the through-holes 2c are not formed in the effective region R. That is, the through-holes 2c are exposed through the opening 3a in the effective region R.

The conductive layer 4 is formed of a conductive material. However, as a material of the conductive layer 4, for the reason to be described below, a metal having a low affinity (reactivity) with a sample and high conductivity is preferably used.

For example, if the conductive layer 4 is formed of a metal such as copper (Cu) that has a high affinity with a sample such as a protein, the sample is ionized in a state in which Cu atoms are attached to sample molecules in a process (to be described below) of ionizing the sample, and there is a chance of detected results deviating in mass spectrometry (to be described below) in proportion when the Cu atoms are attached. Therefore, as the material of the conductive layer 4, a metal having a low affinity with a sample is preferably used.

Meanwhile, a constant voltage is easily applied to a metal having higher conductivity in an easy and stable way. For this reason, if the conductive layer 4 is formed of a high-conductivity metal, a voltage can be uniformly applied to the first surface 2a of the substrate 2 in the effective region R. Further, a metal having higher conductivity also shows a tendency to have higher thermal conductivity. For this reason, if the conductive layer 4 is formed of a high-conductivity metal, the energy of a laser beam with which the substrate 2 is irradiated can be efficiently transmitted to a sample via the conductive layer 4. Therefore, as the material of the conductive layer 4, a high-conductivity metal is preferably used.

In view of this, for example, gold (Au), platinum (Pt), or the like is used as the material of the conductive layer 4. For example, the conductive layer 4 is formed at a thickness of about 1 nm to 350 nm using a plating method, an atomic layer deposition (ALD) method, a vapor deposition method, a sputtering method, or the like. For example, chromium (Cr), nickel (Ni), titanium (Ti), etc. may be used as the material of the conductive layer 4.

Figure 3:
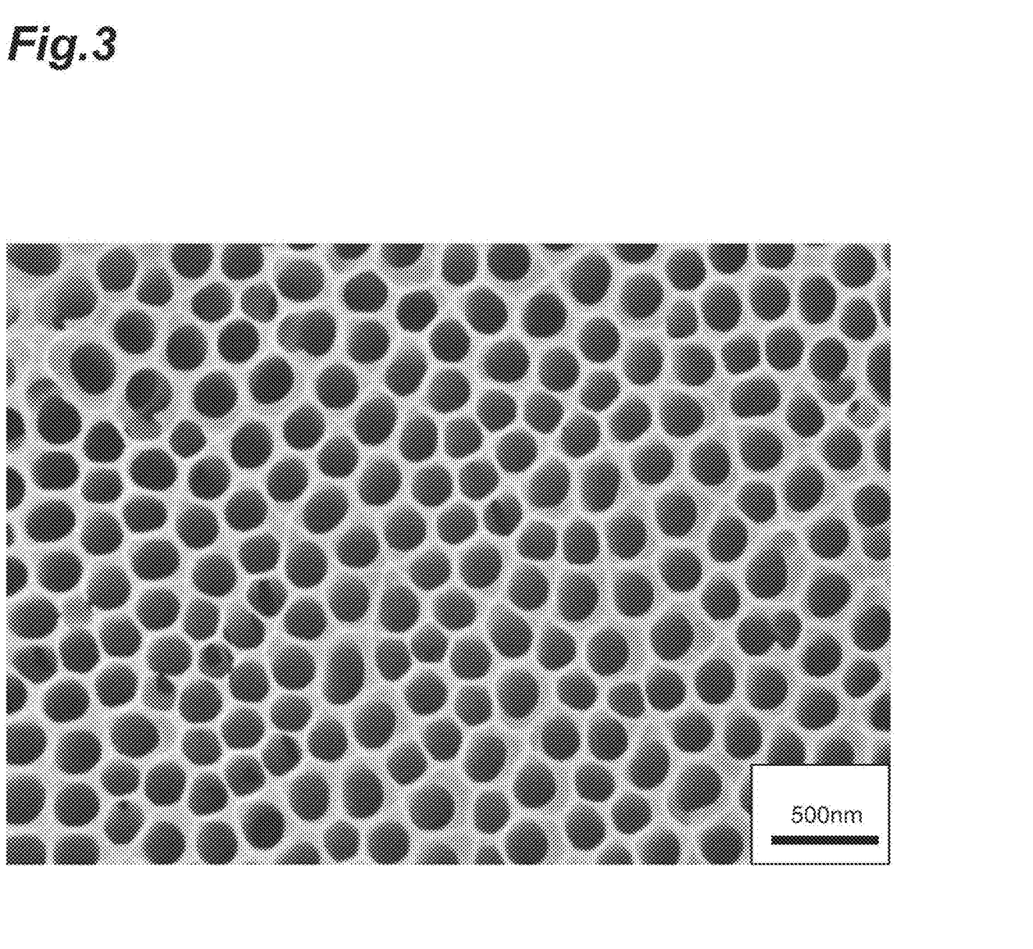
FIG. 3 is a view illustrating an enlarged image of a substrate of the sample support body illustrated in FIG. 1.

FIG. 3 is a view illustrating an enlarged image of the substrate 2 when viewed in the thickness direction of the substrate 2. In FIG. 3, black portions are the through-holes 2c, and white portions are partition wall portions between the through-holes 2c. As illustrated in FIG. 3, the plurality of through-holes 2c having approximately constant widths are uniformly formed in the substrate 2. An aperture ratio of the through-holes 2c in the effective region R (a ratio of all the through-holes 2c to the effective region R when viewed in the thickness direction of the substrate 2) ranges from 10% to 80% in view of practicality, and particularly preferably ranges from 60% to 80%. The sizes of the plurality of through-holes 2c may not be even with one another, and the plurality of through-holes 2c may be coupled to one another.

The substrate 2 illustrated in FIG. 3 is an alumina porous film formed by anodizing aluminum (Al). To be specific, the substrate 2 can be obtained by anodizing an Al substrate and peeling an oxidized surface portion from the Al substrate. The substrate 2 may be formed by anodizing a valve metal other than Al such as tantalum (Ta), niobium (Nb), titanium (Ti), hafnium (Hf), zirconium (Zr), zinc (Zn), tungsten (W), bismuth (Bi), antimony (Sb), or the like, or by anodizing silicon (Si).

Next, the laser desorption/ionization method and the mass spectrometry method using the sample support body 1 will be described. In FIGS. 4 to 7, the through-holes 2c, the conductive layer 4, and the bonding layer 5 are not illustrated in the sample support body 1. Further, for convenience of illustration, for instance, ratios of dimensions are different in the sample support body 1 illustrated in FIGS. 1 and 2 and the sample support body 1 illustrated in FIGS. 4 to 7.

First, the aforementioned sample support body 1 is prepared (a first process). The sample support body 1 may be prepared by being manufactured by a person who carries out the laser desorption/ionization method and the mass spectrometry method, or by being obtained from a manufacturer or a seller.

Figure 4:
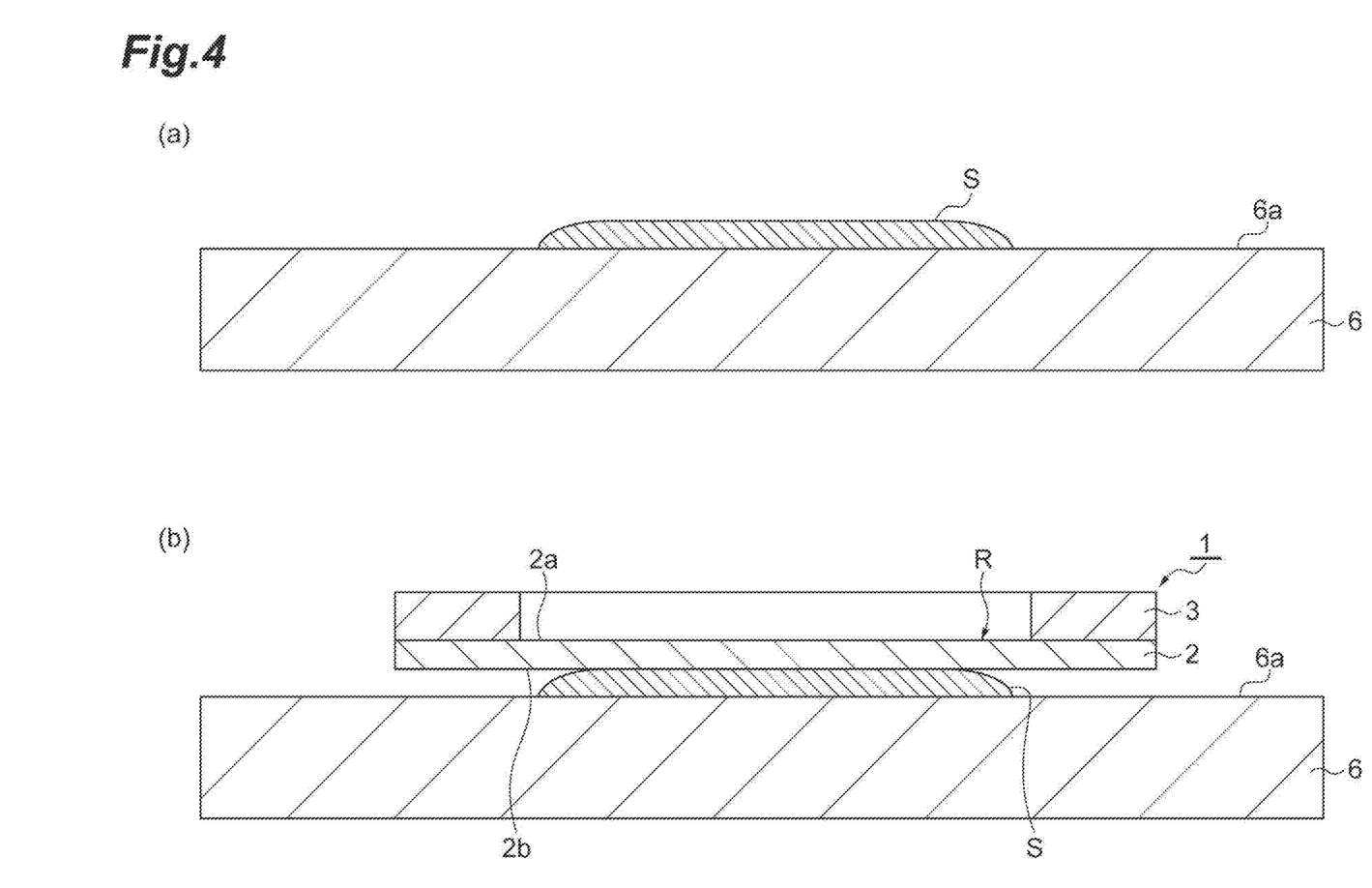
FIG. 4 is a view illustrating a process of the mass spectrometry method of the embodiment.

Next, as illustrated in (a) of FIG. 4, a frozen sample S is mounted on a mounting surface 6a of a slide glass (a mount) 6 under a sub-freezing atmosphere (a second process). The slide glass 6 is a glass substrate on which a transparent conductive film such as an indium tin oxide (ITO) film is formed, and a surface of the transparent conductive film becomes the mounting surface 6a. Without being limited to the slide glass 6, a member capable of securing conductivity (e.g., a substrate formed of a metal material such as stainless steel) may be used as the mount. Next, as illustrated in (b) of FIG. 4, the second surface 2b of the substrate 2 is brought into contact with the frozen sample S, and in this state, as illustrated in (a) of FIG. 5, the sample support body 1 is fixed to the slide glass 6 (the second process). In this case, the frozen sample S is disposed in the elective region R when viewed in the thickness direction of the substrate 2. Further, the sample support body 1 is fixed to the slide glass 6 by a tape 7 (e.g., a carbon tape) having conductivity. To be specific, the tape 7 comes into contact with the conductive layer 4 on the first surface 2a of the substrate 2, and comes into contact with the mounting surface 6a of the slide glass 6, and thus the sample support body 1 is fixed to the slide glass 6. The tape 7 may be a part of the sample support body 1, or may be prepared separately from the sample support body 1. In a case where the tape 7 is a part of the sample support body 1 (i.e., in a case where the sample support body 1 includes the tape 7), for instance, the tape 7 may be fixed on the side of the first surface 2a at a circumferential edge of the substrate 2 in advance. To be more specific, the tape 7 may be fixed on the conductive layer 4 at the circumferential edge of the substrate 2. Here, the sample S is, for instance, a thin film-like biological sample (a hydrous sample) such as a tissue section, and is in a frozen state. The second process is performed in, for instance, a cryostat apparatus under a sub-freezing atmosphere. The sub-freezing atmosphere is a space with a temperature at which the frozen state of the sample S can be maintained, for instance a space with a temperature of −5° C. to −80° C.

Figure 5:
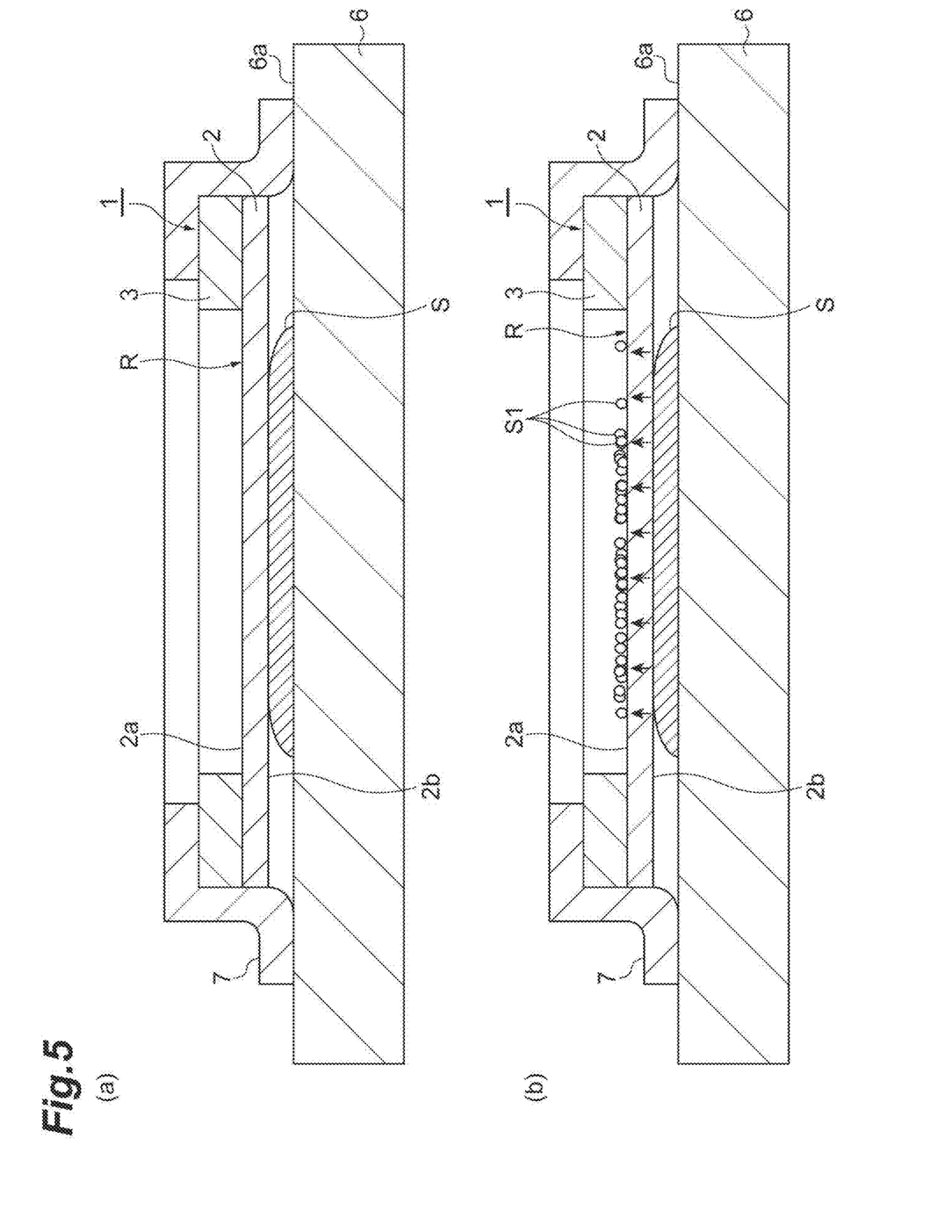
FIG. 5 is a view illustrating a process of the mass spectrometry method of the embodiment.

Next, as illustrated in (b) of FIG. 5, in a state in which the sample S is disposed between the slide glass 6 and the sample support body 1, the sample S is thawed, and components S1 of the thawed sample S move toward the first surface 2a of the substrate 2 via the plurality of through-holes 2c (see FIG. 2) by a capillary phenomenon (a third process). The components S1 that have moved toward the first surface 2a of the substrate 2 stay on the side of the first surface 2a due to surface tension. Here, in the state in which the sample S is disposed between the slide glass 6 and the sample support body 1, the slide glass 6, the sample support body 1, and the sample S are left under a normal temperature atmosphere, and thus the sample S is thawed (a third process). The normal temperature atmosphere is a space with a natural temperature at which neither heating nor cooling occurs, for instance a space with a temperature of 3° C. to 35° C.

Figure 6:
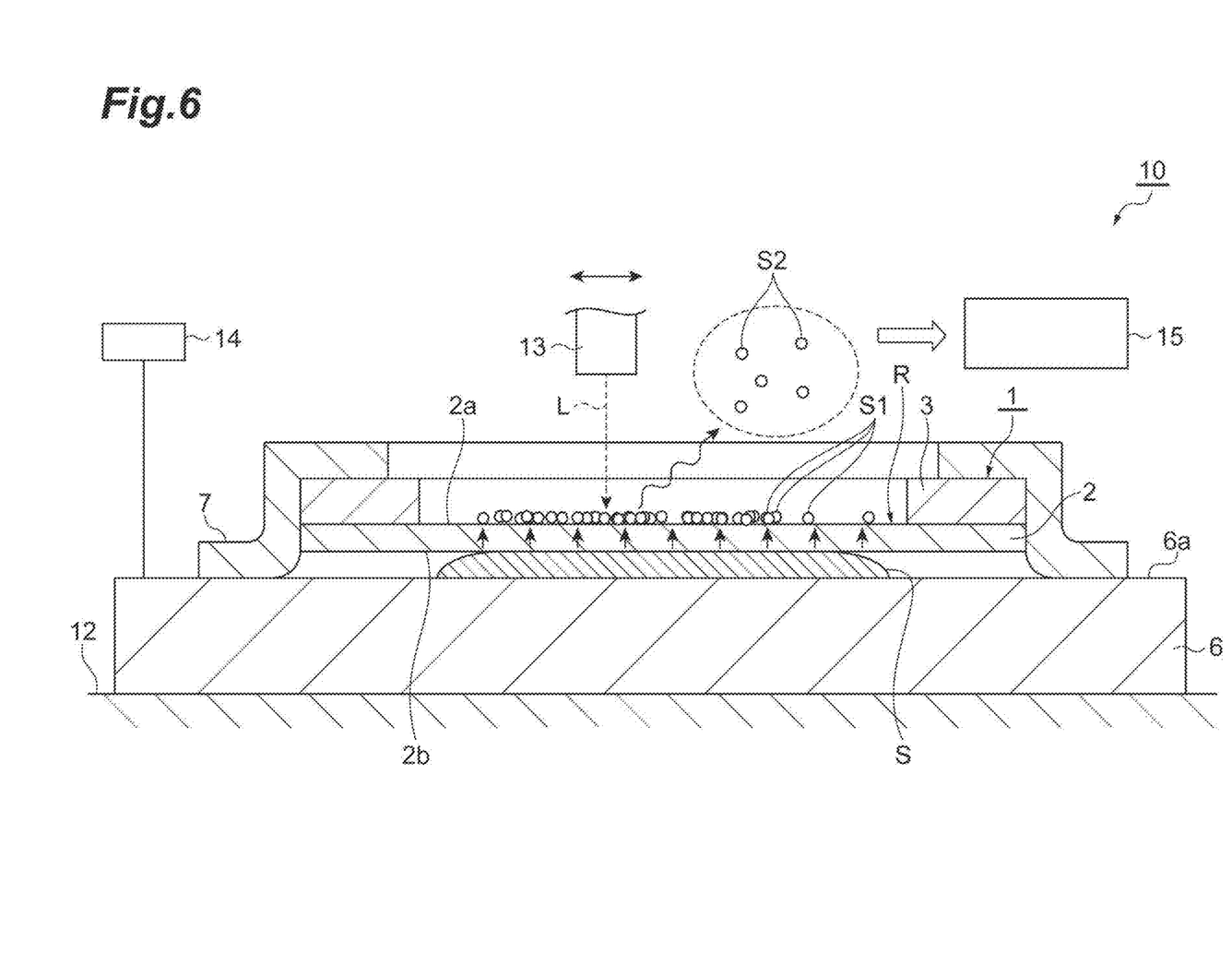
FIG. 6 is a view illustrating a process of the mass spectrometry method of the embodiment.

Next, as illustrated in FIG. 6, in the state in which the sample S is disposed between the slide glass 6 and the sample support body 1, the slide glass 6, the sample support body 1, and the sample S are mounted on a support 12 (e.g., a stage) of a mass spectrometry device 10. Next, a voltage is applied to the conductive layer 4 of the sample support body 1 (see FIG. 2) via the mounting surface 6a of the slide glass 6 and the tape 7 by a voltage application part 14 of the mass spectrometry device 10 (a fourth process). Next, the first surface 2a of the substrate 2 is irradiated with a laser beam L via the opening 3a of the frame 3 by a laser beam irradiation part 13 of the mass spectrometry device 10 (the fourth process). That is, a region of the first surface 2a of the substrate 2 (i.e., a region corresponding to the effective region R) which corresponds to the opening 3a of the frame 3 is irradiated with the laser beam L. Here, the laser beam irradiation part 13 scans the region corresponding to the effective region R with the laser beam L. The scanning the region corresponding to the effective region R with the laser beam L can be performed by operating at least one of the support 12 and the laser beam irradiation part 13.

In this way, the first surface 2a of the substrate 2 is irradiated with the laser beam L while a voltage is applied to the conductive layer 4. Thus, the components S1 that have moved toward the first surface 2a of the substrate 2 are ionized, and sample ions S2 (ionized components S1) are discharged (the fourth process). To be specific, energy is transmitted from the conductive layer 4 (see FIG. 2) absorbing energy of the laser beam L to the components S1 that have moved toward the first surface 2a of the substrate 2, and the components S1 obtaining the energy are evaporated while obtaining electric charges, and become the sample ions S2. The above first to fourth processes are equivalent to the laser desorption/ionization method using the sample support body 1.

The discharged sample ions S2 move while being accelerated toward a ground electrode (not illustrated) provided between the sample support body 1 and an ion detector 15. That is, the sample ions S2 move while being accelerated toward the ground electrode by a potential generated between the conductive layer 4 to which, a voltage is applied and the ground electrode. The sample ions S2 are detected by the ion detector 15 of the mass spectrometry device 10 (a fifth process). Here, the ion detector 15 detects the sample ions S2 to correspond to a scanning position of the laser beam L. Thus, two-dimensional distribution of molecules composing the sample S can be imaged. Here, the mass spectrometry device 10 is a scanning mass spectrometry device using time-of-flight mass spectrometry (TOF-MS). The above first to fifth processes are equivalent to the mass spectrometry method using the sample support body 1.

As described above, in the laser desorption/ionization method using the sample support body 1, components of the thawed sample S in the substrate 2 of the sample support body 1 move toward the first surface 2a via the plurality of through-holes 2c by a capillary phenomenon. Thus, positional information of the sample S (information of two-dimensional distribution of molecules composing the sample S) is maintained in the components S1 of the sample S that have moved toward the first surface 2a of the substrate 2. In this state, since the first surface 2a of the substrate 2 is irradiated with the laser beam L while a voltage is applied to the conductive layer 4, the components of the sample S are ionized while the positional information of the sample S is maintained. Moreover, as the preparing step, the frozen sample S is mounted on the mounting surface 6a of the slide glass 6 under a sub-freezing atmosphere, and the sample support body 1 is fixed to the slide glass 6 in a state in which the second surface 2b of the substrate 2 is in contact with the frozen sample S. Thus, when the sample S is thawed, shrinkage of the sample S is curbed. This also greatly contributes to the maintenance of the positional information of the sample S. Furthermore, as the sample S becomes thick, the sample S tends to greatly shrink when thawed. However, the sample S can be made thick in proportion when the shrinkage of the sample S is curbed. This contributes to securing signal intensity when the sample ions S2 are detected. As described above, according to the laser desorption/ionization method using the sample support body 1, the components of the sample S can be ionized while the positional information of the sample S is maintained.

Further, since the sample S is a hydrous sample or a biological sample, the sample S is disposed between the slide glass 6 and the sample support body 1 in the state in which the sample S is frozen. Afterwards, thawing the sample S is particularly effective in curbing the shrinkage of the sample S to maintain the positional information of the sample S.

Further, in the third process, in the state in which the sample S is disposed between the slide glass 6 and the sample support body 1, the slide glass 6, the sample support body 1, and the sample S are left under a normal temperature atmosphere, and thus the sample S is thawed. Thus, since the sample S can be thawed while reliably curbing the shrinkage of the sample S, the positional information of the sample S can be maintained with higher accuracy.

According to the mass spectrometry method using the sample support body 1, since the components of the sample S are ionized while the positional information of the sample S is maintained, the two-dimensional distribution of molecules composing the sample S can be more accurately imaged.

Figure 7:
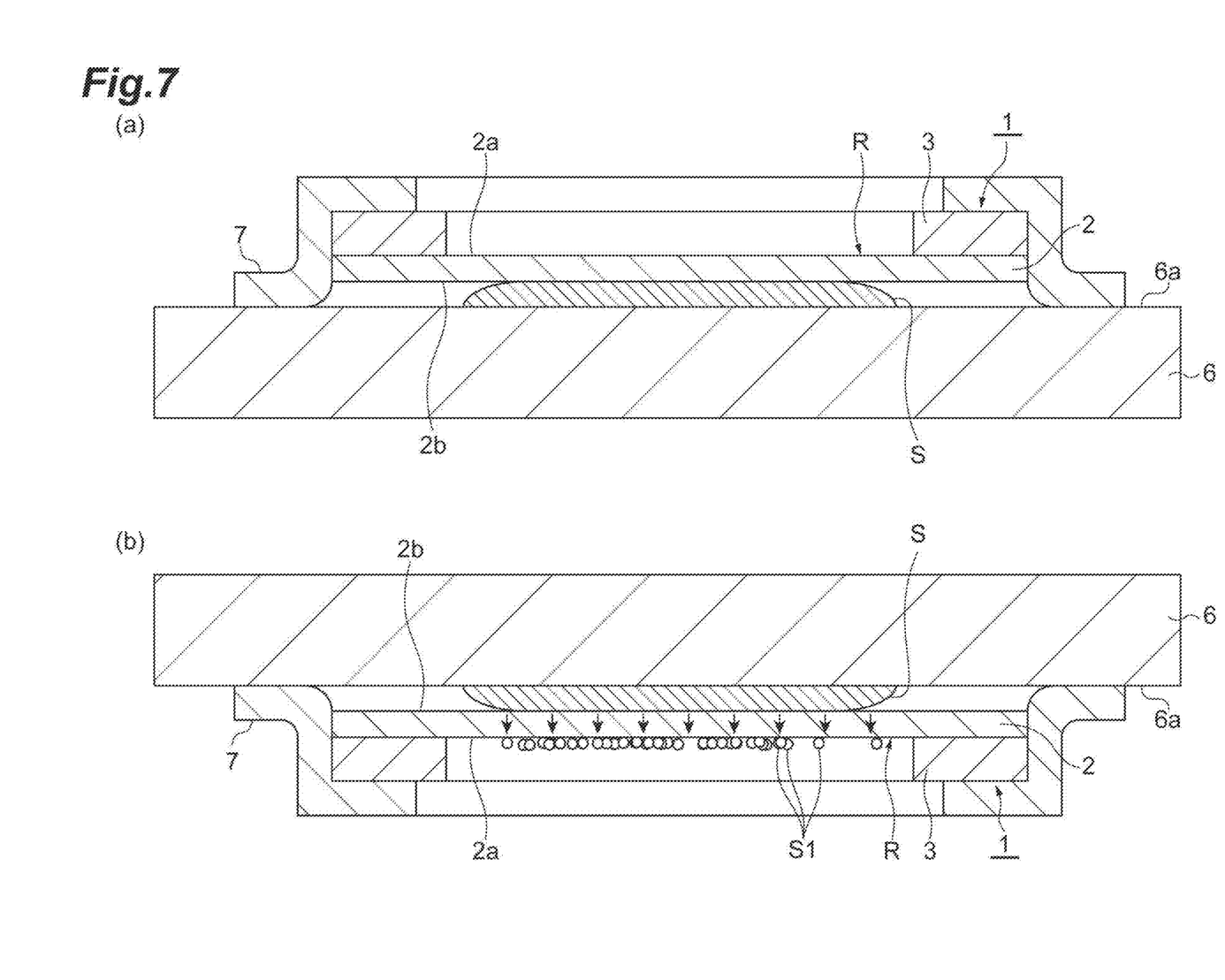
FIG. 7 is a view illustrating a process of the mass spectrometry method of the embodiment.

In a state in which the second surface 2b of the substrate 2 is in contact with the frozen sample 5, the sample support body 1 is fixed to the slide glass 6 as illustrated in (a) of FIG. 7, and then as illustrated in (b) of FIG. 7, in a state in which the sample S is disposed between the slide glass 6 and the sample support body 1 and the sample support body 1 is disposed below the slide glass 6, the sample S may be thawed. Thus, since the gravitational force acts on the frozen sample S, the frozen sample S can be reliably brought into contact with the second surface 2b of the substrate 2. Furthermore, since the gravitational force also acts in addition to the capillary phenomenon, the components of the thawed sample S can be more efficiently moved toward the first surface 2a of the substrate 2.

The present disclosure is not limited to the aforementioned embodiment. For example, as long as the conductive layer 4 is at least provided on the first surface 2a of the substrate 2, the conductive layer 4 may not be provided on the second surface 2b of the substrate 2 and inner surfaces of the through-holes 2c, or may be provided on the second surface 2b of the substrate 2 and the inner surfaces of the through-holes 2c. Further, in the second process, the sample support body 1 may be fixed to the slide glass 6 by a means other than the tape 7 (e.g., a means using a bond, a fixing tool, etc.).

Further, in the fourth process, a voltage may be applied to the conductive layer 4 without the mounting surface 6a of the slide glass 6 and the tape 7. In that case, the slide glass 6 and the tape 7 may not have conductivity. Further, the substrate 2 may have conductivity, and a voltage may be applied to the substrate 2 in the fourth process. In that case, the conductive layer 4 can be omitted in the sample support body 1, and the same effect as the case where the sample support body 1 having the conductive layer 4 as described above is used can be obtained.

Further, in the mass spectrometry device 10, the laser beam irradiation part 13 may collectively irradiate the region corresponding to the effective region R with the laser beam L, and the ion detector 15 may detect the sample ions S2 while maintaining two-dimensional information of the region. That is, the mass spectrometry device 10 may be a projection type mass spectrometry device.

Further, the aforementioned laser desorption/ionization method can also be used in another measurement and test such as ion mobility measurement as well as imaging mass spectrometry in which two-dimensional distribution of the molecules composing the sample S is imaged.

Further, the use of the sample support body 1 is not limited to the ionization of the sample S caused by the irradiation of the laser beam L. The sample support body 1 may be used in the ionization of the sample S caused by irradiation of an energy beam (e.g., an ion beam, an electron beam, etc.) other than the laser beam L.

REFERENCE SIGNS LIST

1: sample support body 2: substrate, 2a: first surface, 2b: second surface, 2c: through-hole, 4: conductive layer, 6: slide glass (mount), 6a: mounting surface, L: laser beam, S: sample.

The invention claimed is:

1. A laser desorption/ionization method comprising:
a first process of preparing a sample support body that includes a substrate in which a plurality of through-holes open in first and second surfaces facing each other are formed and a conductive layer that is at least provided on the first surface;
a second process of mounting a frozen sample on a mounting surface of a mount under a sub-freezing atmosphere, and fixing the sample support body to the mount in a state in Which the second surface is in contact with the frozen sample;
a third process of thawing the sample in a state in which the sample is disposed between the mount and the sample support body, and moving components of the thawed sample toward the first surface via the plurality of through-holes due to a capillary phenomenon; and
a fourth process of irradiating the first surface with a laser beam while applying a voltage to the conductive layer in the state in which the sample is disposed between the mount and the sample support body, and ionizing the components that have moved toward the first surface.

2. The laser desorption/ionization method according to claim 1, wherein the sample is a hydrous sample.

3. The laser desorption/ionization method according to claim 1, wherein the sample is a biological sample.

4. The laser desorption/ionization method according to claim 1, wherein, in the third process, the mount, the sample support body, and the sample are left under a normal temperature atmosphere in the state in which the sample is disposed between the mount and the sample support body, and thus the sample is thawed.

5. The laser desorption/ionization method according to claim 1, wherein, in the third process, the sample is thawed in the state in which the sample is disposed between the mount and the sample support body and the sample support body is disposed below the mount.

6. A laser desorption/ionization method comprising:
a first process of preparing a sample support body that includes a substrate which has conductivity and in which a plurality of through-holes that open in first and second surfaces facing each other are formed;
a second process of mounting a frozen sample on a mounting surface of a mount under a sub-freezing atmosphere, and fixing the sample support body to the mount in a state in which the second surface is in contact with the frozen sample;
a third process of thawing the sample in a state in which the sample is disposed between the mount and the sample support body, and moving components of the thawed sample toward the first surface via the plurality of through-holes due to a capillary phenomenon; and
a fourth process of irradiating the first surface with a laser beam while applying a voltage to the substrate in the state in which the sample is disposed between the mount and the sample support body, and ionizing the components that have moved toward the first surface.

7. A mass spectrometry method comprising:
the processes of the laser desorption ionization method according to claim 1; and
a fifth process of detecting the components ionized in the fourth process.

8. A mass spectrometry method comprising:
the processes of the laser desorption/ionization method according to claim 6; and
a fifth process of detecting the components ionized in the fourth process.

* * * * *